(12) United States Patent
Khouri et al.

(10) Patent No.: US 7,864,944 B2
(45) Date of Patent: Jan. 4, 2011

(54) OPTIMAL CALL SPEED FOR CALL CENTER AGENTS

(75) Inventors: Joseph F. Khouri, San Jose, CA (US); Mukul Jain, San Jose, CA (US); Labhesh Patel, San Francisco, CA (US); Sanjeev Kumar, San Francisco, CA (US); Gebran George Chahrouri, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 1298 days.

(21) Appl. No.: 11/288,574

(22) Filed: Nov. 29, 2005

(65) Prior Publication Data

US 2007/0121893 A1    May 31, 2007

(51) Int. Cl.
*H04M 3/00* (2006.01)
(52) U.S. Cl. .............. 379/265.02; 379/265.07; 379/265.11; 379/265.12
(58) Field of Classification Search .......... 379/88.01, 379/88.04, 265.01, 265.02, 265.07, 265.12, 379/267
See application file for complete search history.

(56) References Cited

U.S. PATENT DOCUMENTS

| 4,472,833 | A |  | 9/1984 | Turrell et al. |
| 5,249,223 | A |  | 9/1993 | Vanacore |
| 5,493,608 | A |  | 2/1996 | O'Sullivan |
| 5,509,064 | A |  | 4/1996 | Welner |
| 5,537,470 | A |  | 7/1996 | Lee |
| 5,633,909 | A |  | 5/1997 | Fitch |
| 5,866,890 | A |  | 2/1999 | Neuner |
| 5,937,051 | A |  | 8/1999 | Hurd et al. |
| 6,056,551 | A | * | 5/2000 | Marasco ............ 434/178 |

(Continued)

FOREIGN PATENT DOCUMENTS

EP          1 030 504 A2    8/2000

(Continued)

OTHER PUBLICATIONS

"Automatic User-Adaptive Speaking Rate Selection for Information Delivery," Nigel Ward and Satoshi Nakagawa, Mechano-Informatcis, School of Information Science and Technology, University of Tokyo, Jun. 25, 2002.

(Continued)

*Primary Examiner*—Ahmad F Matar
*Assistant Examiner*—Antim Shah
(74) *Attorney, Agent, or Firm*—The Law Offices of Bradley J. Bereznak (57) ABSTRACT

A system and method for handling a call from a caller to a call center includes an automatic call distributor (ACD) to receive the call and to route the call to an agent. A module operates to compute a rate of speech of the caller, and a display graphically displays the rate of speech of the caller to the agent during the call session. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

16 Claims, 5 Drawing Sheets

U.S. PATENT DOCUMENTS

| | | | |
|---|---|---|---|
| 6,059,184 | A | 5/2000 | Ahlstrom et al. |
| 6,137,862 | A | 10/2000 | Atkinson et al. |
| 6,160,877 | A | 12/2000 | Tatchell et al. |
| 6,259,786 | B1 | 7/2001 | Gisby |
| 6,333,980 | B1 | 12/2001 | Hollatz et al. |
| 6,847,715 | B1 | 1/2003 | Swartz |
| 6,546,082 | B1 | 4/2003 | Alcendor et al. |
| 6,567,848 | B1 | 5/2003 | Kusuda et al. |
| 6,587,545 | B1 | 7/2003 | Antonucci et al. |
| 6,654,458 | B1 | 11/2003 | Saleh |
| 6,675,216 | B1 | 1/2004 | Quatrano et al. |
| 6,687,877 | B1 | 2/2004 | Sastry et al. |
| 6,798,768 | B1 | 9/2004 | Gallick et al. |
| 6,826,194 | B1 | 11/2004 | Vered et al. |
| 7,249,025 | B2 | 11/2004 | Junqua et al. |
| 6,879,586 | B2 | 4/2005 | Miloslavsky et al. |
| 6,882,641 | B1 | 4/2005 | Gallick et al. |
| 6,845,361 | B1 | 6/2005 | Dowling |
| 6,940,963 | B2 | 9/2005 | Stumer et al. |
| 7,212,111 | B2 | 5/2007 | Tupler et al. |
| 7,295,669 | B1 | 11/2007 | Vered et al. |
| 7,308,246 | B2 | 12/2007 | Yamazaki et al. |
| 7,436,948 | B1 | 10/2008 | Thenthiruperai |
| 2002/0090076 | A1 | 7/2002 | Uppaluru et al. |
| 2002/0196928 | A1 | 12/2002 | Johnson et al. |
| 2003/0002650 | A1 | 1/2003 | Gruchala et al. |
| 2004/0059580 | A1* | 3/2004 | Michelson et al. ....... 704/270.1 |
| 2004/0109555 | A1 | 6/2004 | Williams |
| 2005/0002516 | A1 | 1/2005 | Shtivelman |
| 2005/0059463 | A1 | 4/2005 | Gilmore et al. |
| 2005/0069102 | A1 | 4/2005 | Chang |
| 2005/0089053 | A1 | 4/2005 | Zhu |
| 2005/0163302 | A1 | 7/2005 | Mock et al. |
| 2005/0286705 | A1 | 12/2005 | Contolini et al. |
| 2006/0030290 | A1 | 2/2006 | Rudolf |
| 2007/0127691 | A1 | 6/2007 | Lert, Jr. |

FOREIGN PATENT DOCUMENTS

| | | | |
|---|---|---|---|
| WO | PCT/AU99/00247 | | 4/1999 |

OTHER PUBLICATIONS

"Rate of Speech Modeling for Large Vocabulary Conversational Speech Recognition," Jing Zheng, et al., Speech Technology and Research Laboratory, SRI International, May 18, 2001.

Nigel Ward and Satoshi Nakagawa, "Automatic User-Adaptive Speaking Rate Selection for Information Delivery", Jun. 25, 2002, (4 pages), University of Tokyo, Tokyo, Japan.

Jing Zheng, Horacio Franco, and Andreas Stolcke, "Rate of Speech Modeling for Large Vocabulary Conversation Speech Recognition", May 18, 2001, (5 pages) Speech Technology and Research Laboratory SRI International, http://www.speech.sri.com.

L.Melscoet, "Alcatel CCweb: Marriage of the Internet With the Call Center the Alcatel Ccweb Enables a Company to Combine Its Web Site And Call Center Into a Powerful Contact Center", Electrical communication, Alcatel, Brussels, BE, No. 1, 2000, (pp. 43-47).

D.Steul, "Redefining the Call Center: Customer Service on the Internet", Alcatel telecommunications Review, Alcatel, Paris Cedex, FR, Mar. 2000, (6 pages).

* cited by examiner

OPTIMAL CALL SPEED FOR CALL CENTER AGENTS

FIELD OF THE INVENTION

The present invention relates generally to the field of automatic call distributors; more specifically, to systems and methods for improved interactions between a caller and a call center agent.

BACKGROUND OF THE INVENTION

Interactive voice response (IVR) systems that provide information and channel calls to service agents in response to the spoken words or touch tone signaling of a telephone caller have been deployed for more than a decade. The traditional call center for handling service calls was based on a private branch exchange (PBX) that included core automatic call distributor (ACD) functions for connecting a caller to one of a plurality of agents. During the 1990s, the advent of the Internet, electronic commerce, and computer telephony integration (CTI) transformed the call center in ways that enabled delivery of caller data to agents, thereby enabling agents to become more efficient and to improve customer service levels. Today, many enterprises use multiple call or contact centers (both terms are used synonymously and interchangeably in the present application) that extend across different geographic regions, with communications taking place through public switched telephone networks (PSTNs) and Internet protocol (IP) enabled networks that support multi-channel (voice, e-mail, text chat, and Web collaboration) customer interaction.

By way of example, U.S. Pat. No. 6,798,877 teaches a system in which a caller utilizes a personal computer (PC) for establishing an Internet connection to an ACD and for permitting a caller to select a particular agent. A system for providing information about a telephone caller to a telephone agent, wherein caller-specific data of the caller is used to generate a web page that displays the identified information to the agent is taught in U.S. Pat. Nos. 6,871,212, 6,847,715 discloses a system for operatively integrating an ACD and an IVR unit in which an interaction input from a caller is stored and then transmitted to an appropriate agent workstation. A method and apparatus for analyzing the performance of an IVR system with respect to routing of calls or contacts received in accordance with a contact flow model is described in U.S. Pat. No. 6,879,685.

It is known that callers or users prefer a rate of speaking that is adapted to their own speaking speed. For example, a research paper entitled, "Automatic user-adaptive speaking rate selection for information delivery" (published at http://www.cs.utep.edu/nigel/papers/icslp02-wn.pdf) proposes that IVR systems adapt the speaking rate of their text-to-speech (TTS) engines in order to maximize the user experience. There are a number of known techniques for computing the rate of speech in a conversation. For instance, one method uses phoneme-levels, while another method estimates the rate of speech directly from the waveform and acoustic features of the input utterance. Both methods are described in a paper entitled, "Rate of speech modeling for large vocabulary conversational speech recognition" (available at http://www.speech.sri.com).

As is the case with normal conversational speech, call center agents usually rely on the caller to explicitly notify him when his rate of speech is a problem; that is, to either slow down or speed up his talking speed. Often times, the agent must interpret and respond to clues given to him by the caller, such as when the caller shows impatience, annoyance, or simply asks him to repeat what he just said. In many cases, however, the caller is simply too shy or too reserved to ask the agent to change his rate of speech, leaving the caller disappointed with the interaction.

A few systems have been developed to analyze spoken dialog between a human and a machine. For example, U.S. Pat. No. 6,859,776 teaches a method and apparatus for facilitating interaction between a human user and a processing system that includes a voice activated browser. Information associated with the user is received at the processing system, and the information is then used to optimize a spoken dialog between the user and the processing system. Likewise, U.S. Pat. No. 6,697,457 teaches a system for managing voice messages based on emotion characteristics of the voice messages. Neither of these systems, however, addresses the problem of optimizing a call center agent's rate of speech when talking with a particular caller.

Therefore, what is needed is an automated system and method capable of guiding a call center agent associated with an ACD application to adjust his or her speaking rate to a particular caller in order to provide a more pleasant and satisfying user experience.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A system and method wherein a call center agent is provided with an optimal listening speed for a given caller so as to enable the agent to modify their speaking speed accordingly is described. In the following description specific details are set forth, such as device types, configurations, display fields, etc., in order to provide a thorough understanding of the present invention. However, persons having ordinary skill in the arts will appreciate that these specific details may not be needed to practice the present invention.

According to one embodiment of the present invention, an ACD system first computes an optimal listening speed (OLS) for a caller using any one of a number of known rate of speech computation techniques. The OLS is then visually displayed to the agent servicing the caller along with a feedback indication of the agent's current talking speed. The agent can thus increase or decrease his rate of speech to match the OLS of the caller, thereby enhancing the caller's listening experience and comprehension. In other words, the agent is provided with automatic feedback of how his rate of speech compares with the optimal listening speed of the caller, which enables the agent to speed up or slow down depending on whether his talking speed is higher or lower than that of the caller's OLS.

Figure 1:
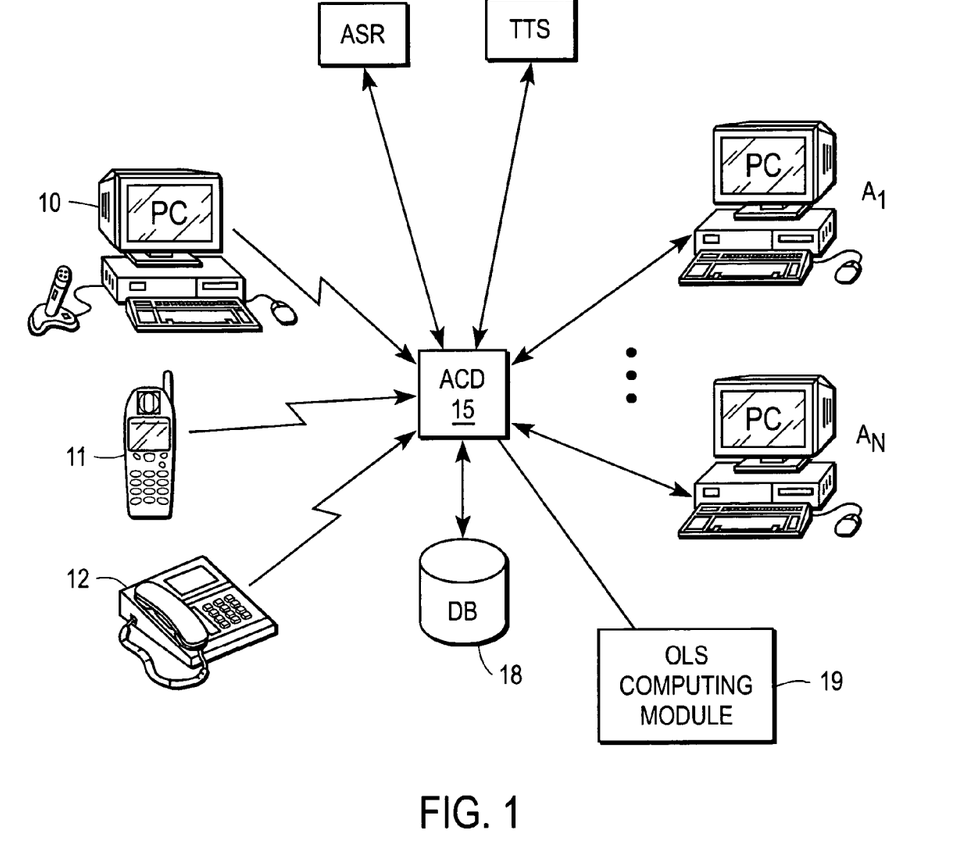
FIG. 1 is a conceptual diagram of a contact center system in accordance with one embodiment of the present invention.

FIG. 1 shows a high-level diagram of a system in accordance with one embodiment of the present invention. The system includes an ACD 15 configured to receive and service calls from a variety of different caller devices, including a personal computer (PC) 10 with built-in telephone communication (e.g., softphone) capabilities, a cellular telephone 11, and a desktop telephone set 12. Callers may connect with ACD 15 across a variety of network types, including conventional IP and PSTN networks. ACD 15 may include a number of hardware, firmware, or software modules that implement a variety of IVR scripts, call routing, and other standard ACD functions.

ACD 15 is also shown in FIG. 1 connected with a plurality of PCs (with built-in telephone functionality) associated with a corresponding plurality of call center service agents ($A_1$-$A_N$), a natural language automatic speech recognition (ASR) module 16 for interpreting and parsing speech of the callers and agents, a text-to-speech (TTS) converter module 17, and an OLS computing module 19 containing algorithms for computing speech rates of callers and agents alike. Each of the modules 16, 17 and 19 may be embodied in a server or other type of data processing device. Computing module 19 is typically implemented as a software (or firmware) component that "sniffs" or "snoops" the data packets in the media stream, differentiating the speech of the agent and caller (by direction of flow), and computing the rate of speech of both persons in the process.

The system of FIG. 1 further comprises a memory or database 18 coupled with ACD 15 for archiving caller (user) information that may include, in various embodiments, recorded speech of a previous call or calls, a prior computed OLS of a caller, and other heuristics and speech rates associated with various agent read-out scripts. Practitioners skilled in the arts will appreciate that in certain implementations elements 16-19 may be incorporated into ACD 15 instead of being provided as separate modules, components or systems.

Figure 3:
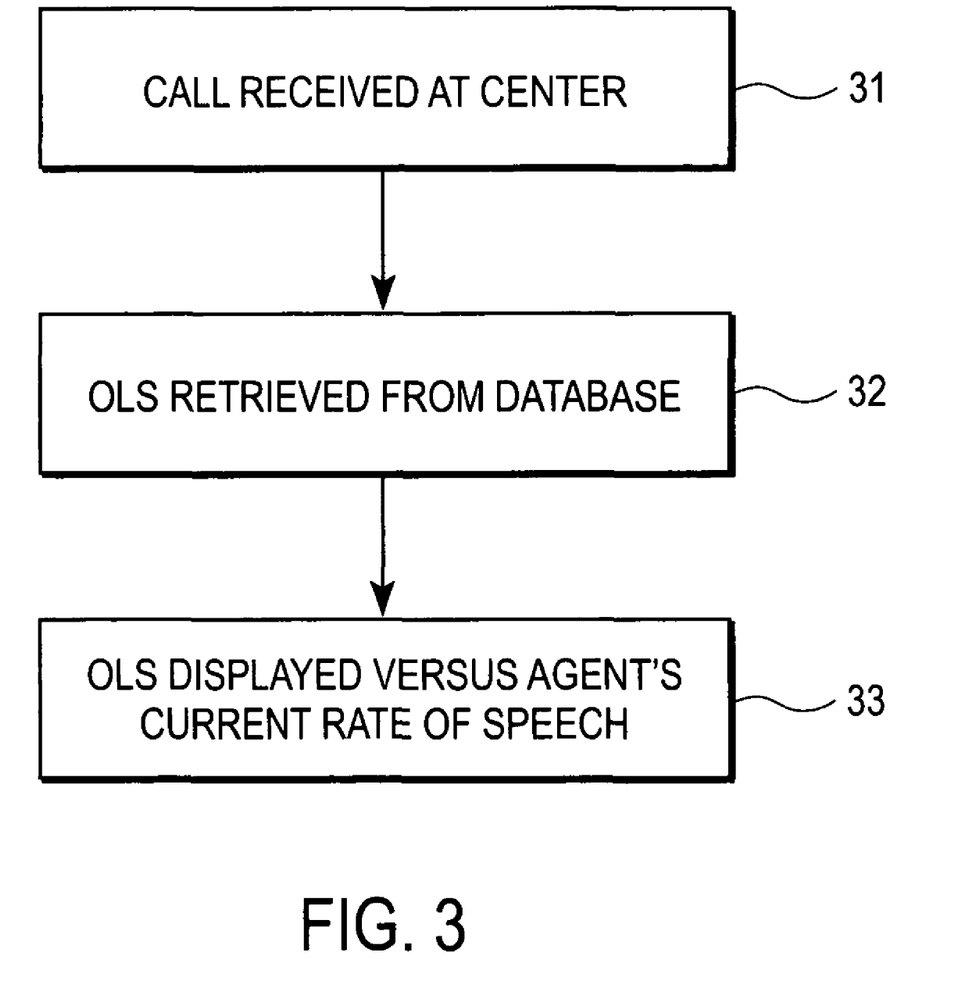
FIG. 3 is a flowchart diagram that illustrates a method of operation according to one embodiment of the present invention.

In the embodiment illustrated by the flowchart of FIG. 3, the ACD system of FIG. 1 responds to an incoming call (block 31) by retrieving the historical OLS of a caller from database 18 (block 32). The caller may be identified by the calling number of the user's telephone device, from a caller response to an IVR prompt, using a standard speech recognition program (with identifying voice patterns being stored in database 18), or any other known caller identification methods. In the case where a person calls into ACD 15 for the first time, the system may compute a new OLS for the caller from the current conversation between the caller and the agent. It is appreciated that the OLS of a caller matches the ordinary talking speed of the caller. In the case where the caller has a call history with the system, the OLS may simply be retrieved or computed from the last call. Even in cases where the caller has made previous calls to the call center, the ACD system may either retrieve a prior computed OLS for the caller or compute an initial OLS based on recorded speech of the caller, and then update the OLS dynamically as the current conversation between the caller and agent progresses.

Figure 2:
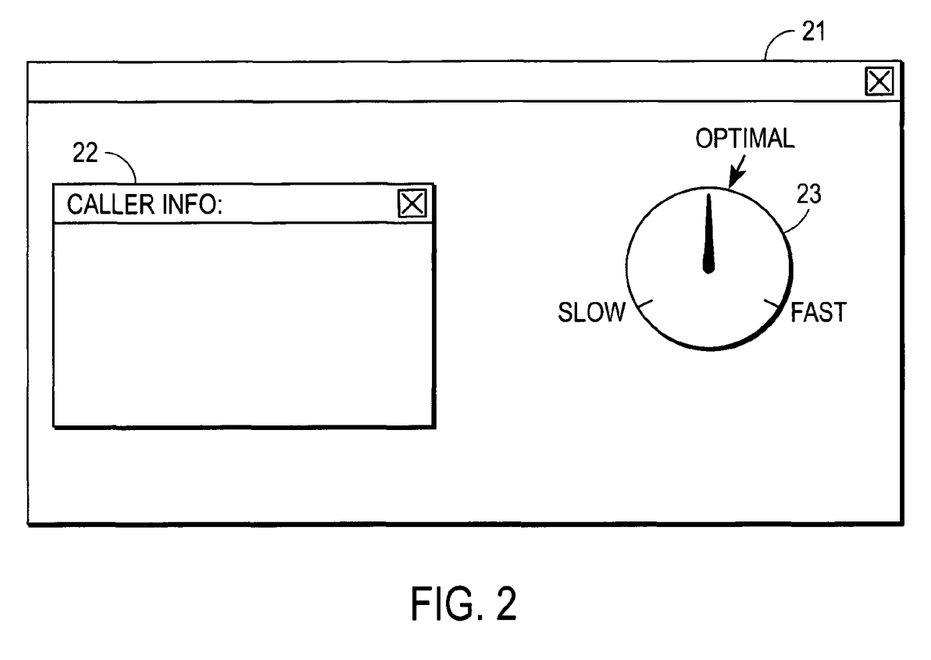
FIG. 2 illustrates a graphical user interface window associated with an application running on a PC of an agent in accordance with one embodiment of the present invention.

Once the OLS for the caller has been either retrieved from database 18 or computed by module 19, the OLS is displayed in a feedback indicator field 23 of a graphical user interface (GUI) window 21 on the servicing agent's PC (see FIG. 2 and block 33 in FIG. 3). In the embodiment of FIG. 2, field 23 comprises a dial-type indicator with the OLS being shown as an arrow labeled "Optimal" on dial 23. As can be seen, the rotary arm of dial 23 points to the current computed rate of speech of the agent. In this example, the agent's rate of speech is slower than that of the caller, indicating that the agent should speak faster to provide a more pleasant and satisfying user experience. Note that the exemplary GUI window 21 shown in FIG. 2 also includes a user information field 22 that displays user profile information for the agent such as the name of the caller, caller history, applications being used during the current session, etc.

It should be understood that a variety of different types of feedback indicator display fields may be utilized in various embodiments of the present invention. For instance, instead of a dial or meter type of indicator, field 23 may simply comprise a text display of the words "faster", "slower", or "optimal" on the agent's monitor or screen, indicating how the agent should alter their talking speed to match the OLS of the caller. In other embodiments, field 23 may comprise a display of a numerical value, e.g., 70 words per minute, which represents the OLS of the caller. In this latter embodiment, the agent alters their rate of speech based on personal knowledge of their own talking speed and experience in matching their speech to different rates.

Figure 5:
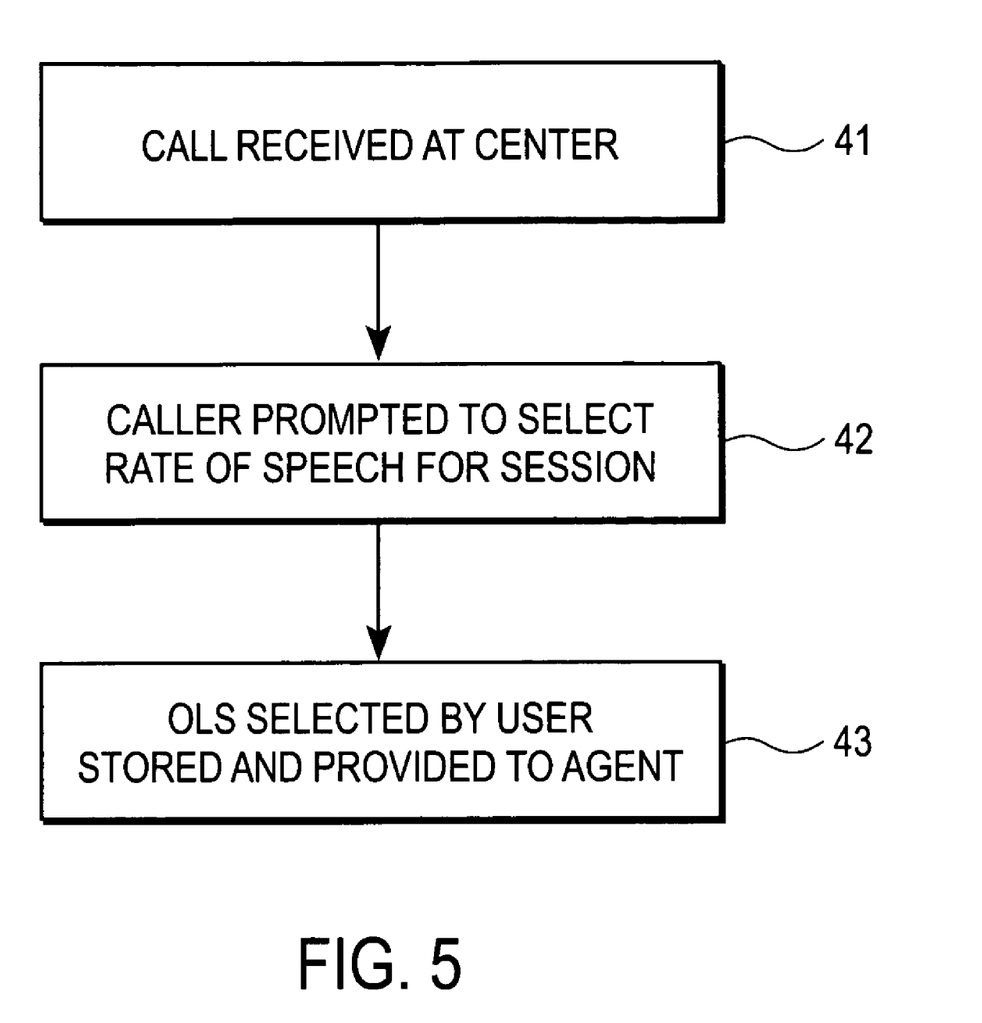
FIG. 5 is a flowchart diagram that illustrates a method of operation according to another embodiment of the present invention.

FIG. 5 is a flowchart diagram that illustrates a basic method of operation according to another embodiment of the present invention. In the embodiment of FIG. 5, the caller can specifically set the OLS for himself in response to an IVR prompt from the ACD system. For instance, after the call is received at the center (block 41), the ACD may prompt the caller to select a rate of speech (e.g., fast, slow, normal). Alternatively, the ACD system can read out a text at different speeds to the caller, allowing the caller to choose the most suitable or preferred rate of speech. The OLS selected by the caller is then recorded (archived) by the system, and may be used by the ACD system to provide feedback to call center agents for subsequent or future calls from the same caller.

As previously discussed, in yet another embodiment the ACD system may retrieve the OLS that was used during the last call session with the caller, utilizing it as a starting OLS for the current call session with the same caller.

Figure 4:
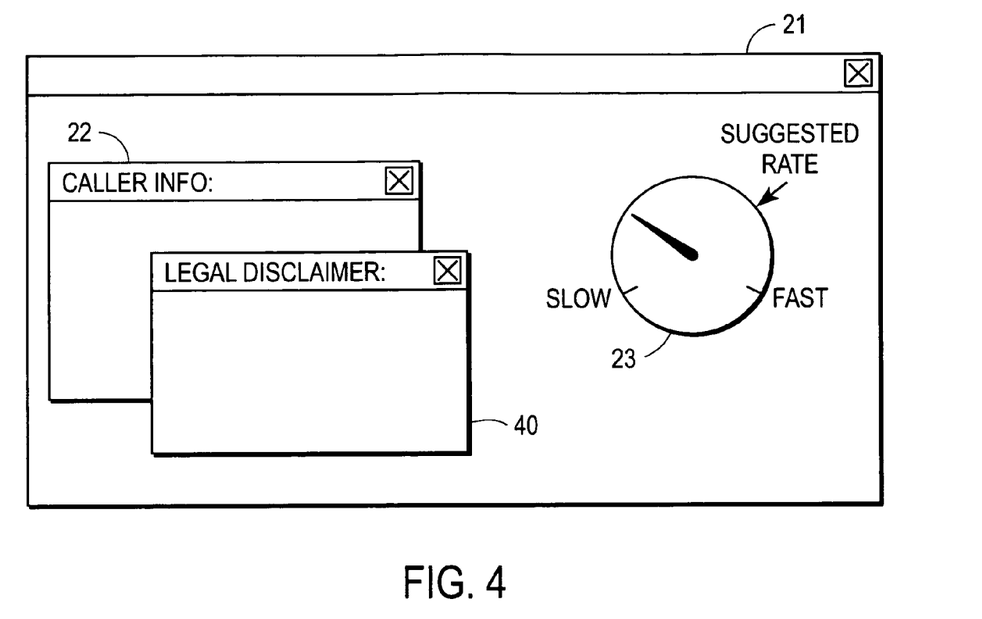
FIG. 4 illustrates a graphical user interface window associated with an application running on a PC of an agent in accordance with another embodiment of the present invention.

FIG. 4 illustrates a graphical user interface window 21 associated with an application running on a PC of an agent in accordance with still another embodiment of the present invention. As in the previous embodiment of FIG. 2, GUI window includes a feedback indicator field 23 comprises a dial-type indicator, and a user profile information data window or field 22. Also shown in the example of FIG. 4 is a legal disclaimer window 40. Window 40 includes text that may be pulled up and read out to the caller by the agent during the course of the call session. Other types of text scripts commonly read out by call center agents include notices, disclaimers, policy statements, rights, terms and conditions, scripted interaction, etc. These types of text scripts are frequently referred to as "boilerplate" text.

Often times, there is a suggested rate of speech associated with the read-out of this type of boilerplate text, which differs from the normal rate of speech or OLS for a given caller. The rate of speech associated with this particular content read out by the agent is shown in FIG. 4 by the "Suggested Rate" arrow in field 23. By way of example, assuming that the caller has an OLS value of 5 (on a scale of 1 to 10) computed by the ACD system. According to the embodiment of FIG. 4, the system may be programmed to suggest a rate of speech having a value of 7 (i.e., faster by 20%) when reading out the text in window 40.

In another scenario, different sections of the scripted text may have different OLS values. For instance, the agent may be provided with a suggested rate of 5 for the first section of the scripted text, an OLS with a value of 3 for a second section of text, and a value of 8 for third section of the scripted text. In other words, the system may be programmed to dynamically change the suggested rate of speech prompt provided to the agent in the feedback indicator field based on the content of the text being read out.

It is appreciated that in another implementation of the present invention, prior recordings of different callers may be used to coach or train the call center agents, so they may learn to adapt their rate of speaking to the OLS of a caller, or simply improve their skill and ability to speak at different rates.

In still another embodiment of the present invention, groups of call center agents are characterized and grouped according to their natural rate of speech; that is, a range of rates within which they are most comfortable talking. For example, at a given call center, agents $A_1$-$A_3$ may have a range of 50-60 words per minute (Group I); agents $A_4$-$A_8$ may have a range of 60-70 words per minute (Group II); and agents $A_9$-$A_{11}$ may have a range of 70-80 words per minute (Group III). When a call arrives at the call center, the call routing engine of the ACD may route a particular caller to a specific group of agents by matching the computed or retrieved OLS of the caller to the talking speed range associated with a specific group of agents. For example, a caller with an OLS of 65 words per minute (based on call history) may have his call routed by the ACD to the next available agent in Group II. In other words, in one embodiment of the present invention the ACD system operates to match up callers to agents based on mutually compatible normal speech rates.

It should also be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A system for handling a call from a caller to a call center comprising:
    an automatic call distributor (ACD) to receive the call and to route the call to an agent; and
    a module that operates to compute a first rate of speech of the caller and to compute a current rate of speech of the agent;
    a display to visually display the first rate of speech of the caller to the agent versus the current rate of speech of the agent, thereby enabling the agent to modify the current rate of speech to more closely match the first rate of speech.

2. The system of claim 1 wherein the module computes the first rate of speech of the caller from a media stream of the call received by the ACD.

3. The system of claim 1 wherein the ACD includes an interactive voice response (IVR) system that prompts the caller to select an optimal rate of speech, the optimal rate of speech being displayed to the agent on the display.

4. The system of claim 1 wherein the display comprises a graphical user interface (GUI) of a computer associated with the agent, the GUI including a feedback indicator field that graphically displays the first rate of speech of the caller versus the current rate of speech of the agent.

5. The system of claim 1 further comprising:
    a database coupled with the ACD to store the first rate of speech of the caller computed by the module.

6. A system for servicing a call from a caller to a contact center comprising:
    an automatic call distributor (ACD) to receive the call and to route the call to one of a plurality of agents; and
    a memory, coupled with the ACD, that stores a rate of speech for each of the plurality of agents, the memory also storing information associated with the caller that includes an optimal listening speed (OLS) of the caller, the ACD operates to route the call to the one of the plurality of agents by accessing the memory and matching the OLS of the caller to the rate of speech of the one of the agents;
    a module that operates to compute a new OLS from a current conversation of the caller and to update the new OLS dynamically as the current conversation progresses; and
    a display that provides a visual indication to the one of the agents of whether to speak faster or slower to better match the new OLS.

7. The system of claim 6 wherein the rate of speech for each of the plurality of agents comprises a range of speaking rates.

8. The system of claim 6 wherein the visual indication includes a feedback indicator field that graphically display the new OLS of the caller versus the rate of speech of the one of the agents.

9. The system of claim 8 wherein the visual indication includes a text display that indicates how the one of the agents should alter their speech.

10. A computer-automated method of servicing a caller at a call center comprising:
    prompting the caller to select an optimal listening speed (OLS) for a call session;
    selecting an agent for the call session from a group of agents having a rate of speech that is substantially matched to the OLS;
    computing a current rate of speech of the agent; and
    displaying the OLS to the agent versus the current rate of speech of the agent in a visual indication field during the call session, thereby enabling the agent to modify the current rate of speech to more closely match the OLS.

11. The computer-automated method of claim 10 further comprising providing a suggested rate of speech to the agent via the display for reading a scripted text to the caller.

12. A computer-automated method of servicing a caller at a call center comprising:
    determining an initial optimal listening speed (OLS) for the caller based on input received from the caller during a call session;
    routing the caller to an agent in a group of agents each having a rate of speech that substantially matches the initial OLS;
    computing a first rate of speech of the caller and a current rate of speech of the agent based on a current conversation between the caller and the agent;
    graphically displaying the first rate of speech versus the current rate of speech to an agent in a visual field during the call session, the visual field being dynamically updated based on the computations of the first rate of speech of the caller and the current rate of speech of the agent.

13. The computer-automated method of claim 12 further comprising providing a suggested rate of speech of to the agent for reading a scripted text to the caller.

14. The computer-automated method of claim 12 further comprising storing the initial OLS of the caller in a database.

15. The computer-automated method of claim 12 wherein the determining of the initial OLS comprises:
   reading out a text at different speeds; and
   prompting the caller to select one of the different speeds.

16. The computer-automated method of claim 12 wherein the determining of the initial OLS comprises:
   accessing a database to retrieve the initial OLS.

* * * * *

UNITED STATES PATENT AND TRADEMARK OFFICE
CERTIFICATE OF CORRECTION

| | | |
|---|---|---|
| PATENT NO. | : 7,864,944 B2 | |
| APPLICATION NO. | : 11/288574 | |
| DATED | : January 4, 2011 | |
| INVENTOR(S) | : Khouri et al. | |

It is certified that error appears in the above-identified patent and that said Letters Patent is hereby corrected as shown below:

On the Title page, Item (54) and at Column 1, lines 1 and 2, the Title: "OPTIMAL CALL SPEED FOR CALL CENTER AGENTS" should read -- SYSTEM AND METHOD FOR OPTIMIZING THE RATE OF SPEECH OF CALL CENTER AGENTS --.

Signed and Sealed this
Nineteenth Day of April, 2011

David J. Kappos
*Director of the United States Patent and Trademark Office*